United States Patent [19]

Decore et al.

[11] Patent Number: 5,379,972
[45] Date of Patent: Jan. 10, 1995

[54] EQUIPMENT SUPPORT ADAPTED TO BE ATTACHED TO THE BODY OF TRUNKING WITH INWARDLY FACING LIPS

[75] Inventors: Bertrand Decore, La Chapelle St. Aubin; Francois Perrignon de Troyes, Le Mans, both of France

[73] Assignee: LEGRAND, Limoges, France

[21] Appl. No.: 159,544

[22] Filed: Dec. 1, 1993

[30] Foreign Application Priority Data

Dec. 1, 1992 [FR] France ............... 92 14441

[51] Int. Cl.6 ............................................. G12B 9/00
[52] U.S. Cl. ............................... 248/27.1; 361/644
[58] Field of Search .............. 248/27.1, 27.3, 220.1; 361/727, 726, 644, 725; 312/229

[56] References Cited

U.S. PATENT DOCUMENTS

| | | | |
|---|---|---|---|
| 2,583,586 | 1/1952 | Miller | 361/725 |
| 2,876,394 | 3/1959 | Gerrish | 361/645 |
| 3,046,516 | 7/1962 | Tymkewicz | 248/27.1 X |
| 3,286,133 | 11/1966 | Sturdivan | 361/644 X |
| 3,436,602 | 4/1969 | Bassani | 361/644 X |
| 3,780,353 | 12/1973 | Gordon | 248/27.1 X |
| 4,080,644 | 3/1978 | Reed | 361/644 X |
| 4,289,361 | 9/1981 | Riedel | 312/229 X |
| 5,062,604 | 11/1991 | Monnier | 248/220.2 X |
| 5,256,841 | 10/1993 | Zanella | 248/27.1 X |
| 5,259,655 | 11/1993 | Anderson | 248/27.1 X |

FOREIGN PATENT DOCUMENTS

| | | |
|---|---|---|
| 0222116 | 5/1987 | European Pat. Off. |
| 2584243 | 1/1987 | France |
| 2668863 | 5/1992 | France |

*Primary Examiner*—J. Franklin Foss
*Attorney, Agent, or Firm*—Young & Thompson

[57] ABSTRACT

An equipment support can be attached to the body of trunking having two inwardly facing lips. The support has on each edge of each of two mutually orthogonal pairs of opposite edges of unequal length a groove which can be engaged on these lips.

14 Claims, 2 Drawing Sheets

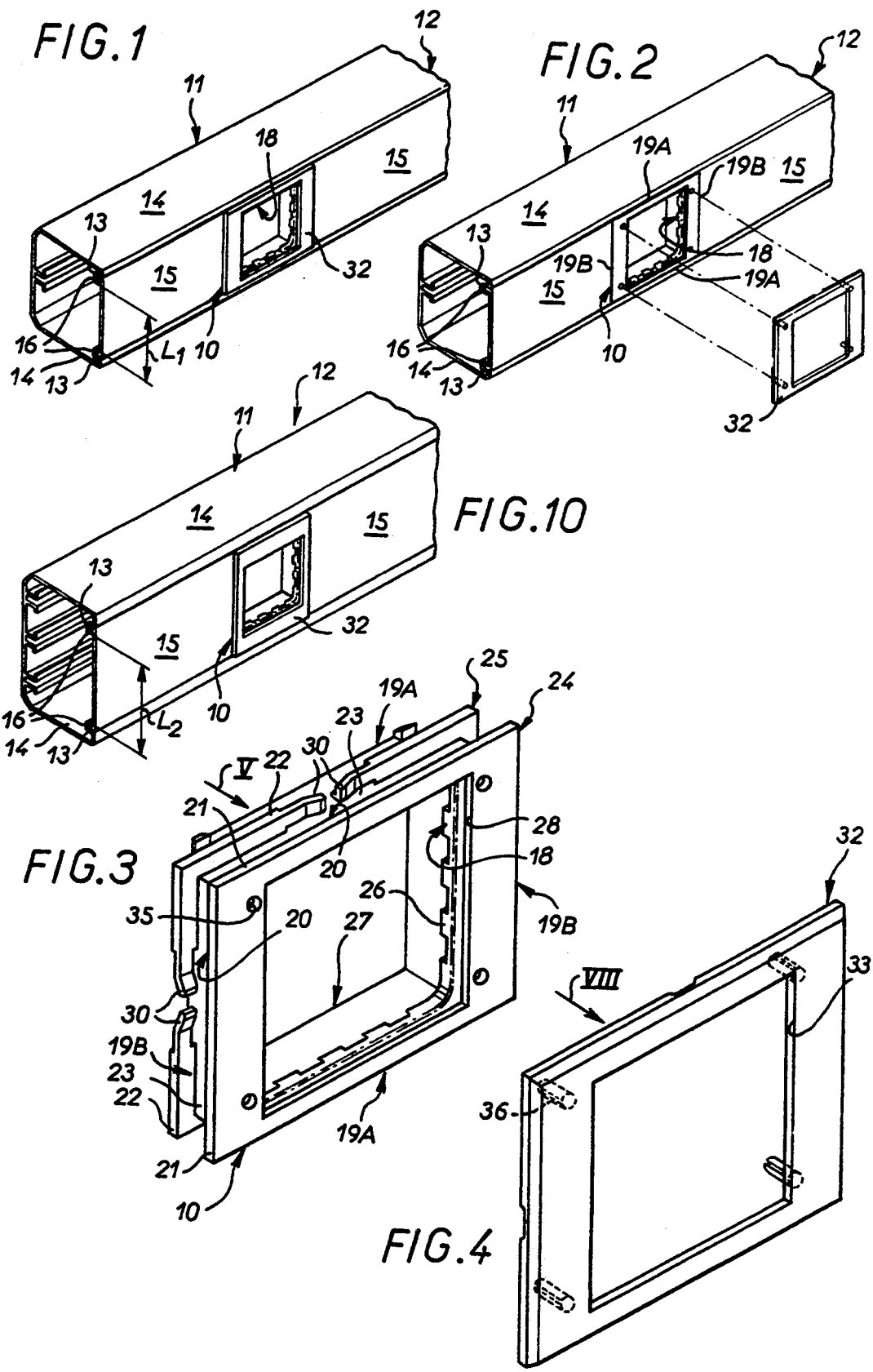

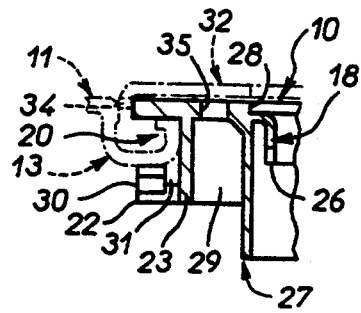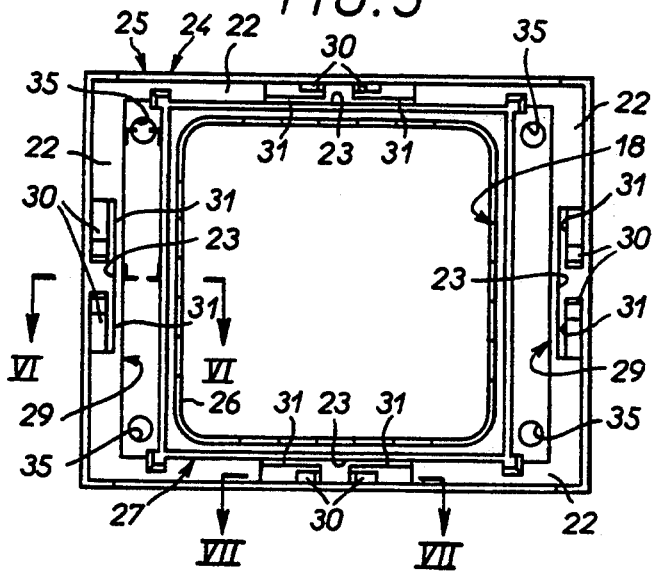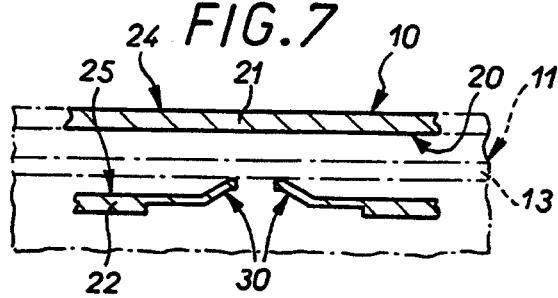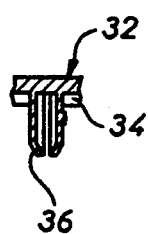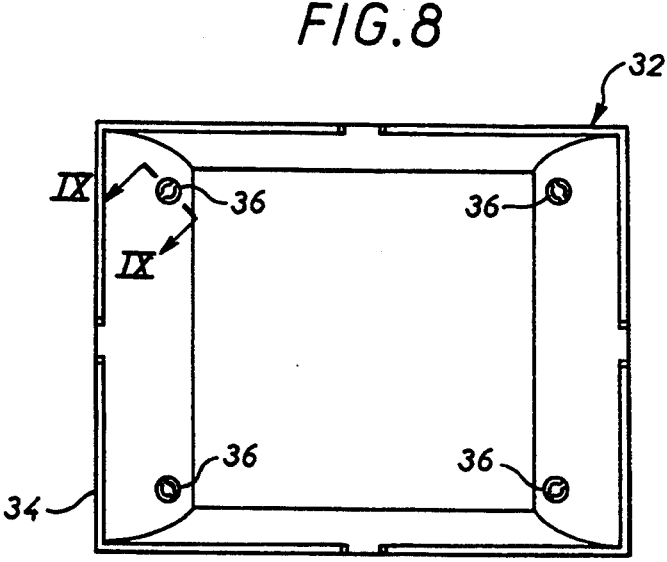

EQUIPMENT SUPPORT ADAPTED TO BE ATTACHED TO THE BODY OF TRUNKING WITH INWARDLY FACING LIPS

BACKGROUND OF THE INVENTION

1. Field of the Invention

The present invention is generally concerned with supports used to mount any kind of equipment, for example any kind of electrical equipment, to the body of trunking having an inwardly facing lip along the free edge of each of two side flanges.

2. Description of the Prior Art

These lips, which are usually gutter shaped, are normally provided for snap fastening a cover.

However, they may instead be used in a localized area to mount an equipment support instead of a cover.

At present, an equipment support of this kind accordingly comprises groove means on two opposite edges adapted to fit over these lips.

It has on its other two edges tangs adapted to be inserted under the adjacent cover in order to provide the necessary seal at this point.

Equipment supports of this type are generally satisfactory.

They have the following drawbacks, however.

Firstly, they may be fitted to the trunking body only by their edges provided with the groove means.

As a result, they match only one width of trunking (to be more precise, one width of cover), this width being, for example, the distance between the two lips over which they can be fitted.

Trunking is available in various widths.

Thus at present as many different types of equipment support are required as there are different widths of cover, which increases inventory and therefore increases costs.

In the direction perpendicular to the lips over which they are fitted the current equipment supports of this kind have some clearance relative to the lips, within the limits of the groove means by means of which they are inter-engaged with the latter, which is detrimental to their esthetic effect, should they become skewed, to the seal obtained, should a gap remain between them and the lips with which they are engaged, and finally to their stability on the trunking to which they are fitted and consequently to the user's perception of the system.

Finally, being merely fitted alongside the cover for which they are locally substituted, they leave the corresponding end of the cover exposed, again to the detriment of the overall esthetic effect if the cover is not cut perfectly.

A general object of the present invention is to provide arrangements which reduce, if not eliminate these drawbacks.

SUMMARY OF THE INVENTION

The present invention consists in an equipment support adapted to be attached to the body of trunking having two inwardly facing lips, said support having on each edge of each of two mutually orthogonal pairs of opposite edges of unequal length groove means adapted to be engaged on said lips.

The equipment support in accordance with the invention can therefore be mounted on the trunking body in either of two orthogonal orientations, one matching a first cover width and the other matching a second, different cover width.

The inventory required to cover all feasible situations is thus advantageously halved.

In a second arrangement, at least one elastically deformable blade member is provided in the groove means on at least one of the cheeks defining said groove means and projecting towards the other cheek.

This elastically deformable blade member urges the equipment support in accordance with the invention against the lips over which it is fitted, to the benefit of the overall esthetic effect, to the seal obtained and to its stability.

Finally, in a third arrangement, an embellisher is associated with the equipment support having outside dimensions larger than its own.

This embellisher is removable, for example, and can be snap fastened to the equipment support from the front.

Alternatively, it may be in one piece with the equipment support.

Be this as it may, the embellisher is adapted to overlap the adjoining cover and to conceal the end of the latter and any cutting defects thereof, to the benefit of the overall esthetic effect.

The features and advantages of the invention will emerge from the following description given by way of example with reference to the appended diagrammatic drawings.

BRIEF DESCRIPTION OF THE DRAWINGS

FIG. 1 is a perspective view of trunking to the body of which an equipment support in accordance with the invention is attached.

FIG. 2 is a perspective view repeating FIG. 1 with the addition of an embellisher associated with the equipment support in accordance with the invention, shown separated from it.

FIG. 3 is a perspective view to a larger scale of an equipment support in accordance with the invention shown in isolation.

FIG. 4 is a perspective view of an embellisher associated with the equipment support, to the same scale as FIG. 3 and in corresponding relationship thereto.

FIG. 5 is a rear view of the equipment support in accordance with the invention as seen in the direction of the arrow V in FIG. 3.

FIGS. 6 and 7 are partial views in transverse cross-section on the respective lines VI—VI and VII—VII in FIG. 5.

FIG. 8 is a rear view of the embellisher associated with the equipment support in accordance with the invention as seen in the direction of the arrow VIII in FIG. 3.

FIG. 9 is a partial view of the embellisher in transverse cross-section on the line IX—IX in FIG. 8 and to a larger scale.

FIG. 10 is a perspective view of a trunking to the body of which an equipment support in accordance with the invention is attached.

DETAILED DESCRIPTION OF THE INVENTION

Referring to the figures, and to FIGS. 1 and 2 in particular, the equipment support 10 in accordance with the invention is adapted to be attached to the body 11 of trunking 12 having an inwardly facing lip 13 along the free edge of each of its two side flanges 14.

The trunking body 11 being well known in itself and forming no part of the present invention, it will not be described in complete detail here.

The same is true of the cover 15 which is adapted to close it and with it forms the trunking 12.

Suffice to say that the lips 13 on the trunking body 11 are generally gutter shaped and are therefore adapted to have beads 16 projecting for this purpose from the back of the cover 15 snapped into them.

Let L1 (FIGS. 1 and 2) or L2 (FIG. 10) denote the width of the cover 15, as measured for example from one lip 13 of the trunking body 11 to the other.

The cover width varies from one type of trunking 12 to another.

In the embodiment shown here L2 is greater than L1.

In the known manner the cover 15 is interrupted locally to fit the equipment support 10 which is locally substituted for it.

The middle part of the equipment support 10 has a central opening 18 to receive any kind of equipment (not shown).

This equipment may be an item of electrical equipment such as a socket outlet, for example.

In the embodiment shown the contour of the central opening 18 in the equipment support 10 is square, but for reasons that will emerge later the equipment support 10 in accordance with the invention itself has an outside contour in the shape of a rectangle with unequal sides.

The equipment support 10 therefore has two longer edges 19A and, between the latter, two shorter edges 19B.

In a way that is known in itself and by virtue of arrangements to be described in more detail later, the equipment support 10 has on two opposite edges (its edges 19A, for example) groove means 20 adapted to fit over the lips 13 of a trunking body 11.

According to the invention, the equipment support 10 further comprises groove means 20 adapted for such engagement on its other two edges, i.e. the two edges 19B which lie between the edges 19A and with the latter form a rectangle with unequal sides.

The groove means 20 on each edge 19A, 19B are formed by two substantially parallel cheeks 21, 22 and a back 23.

At least one of the cheeks 21, 22 (here the outermost cheek 21) extends along all of the length of the edges 19A, 19B and is continuous with a common flat frame 24 with a rectangular outside contour and which forms a front frame for the equipment support 10.

The other cheek (here the innermost cheek 22) is subdivided for reasons to be explained later into two sections each at a respective end of each of the edges 19A, 19B concerned and each continuous with respective sections of the adjoining edges 19B, 19A.

In other words, the innermost cheek 22 on each edge 19A, 19B is locally interrupted in its middle part.

Except for this interruption, the innermost cheek 22 and the outermost cheek 21 are continuous with a common flat frame 25 with a rectangular outside contour which lies behind and parallel to the flat frame 24.

The outside dimensions of the flat frame 25 are slightly smaller than those of the flat frame 24.

The central opening 18 is defined by a rearwardly directed rim 26 which over part only of its height runs inside and at a distance from a tubular frame 27 upstanding from the flat frame 24 along its inside contour 28 and which has a square transverse cross-section.

The square inside contour 28 of the flat frame 24 is therefore offset outwards relative to that of the central opening 18.

For locating an item of equipment to be snap-fastened to the rim 26, the edge of the rim 26 is crenellated.

On the longer edges 19A the back 23 of the groove means 20 is formed directly by the respective sides of the tubular frame 27.

On the shorter edges 19B the back 23 is separate from the respective sides of the tubular frame 27, however, forming recesses 29 with the latter on the back of the flat frame 24 (FIGS. 5 and 6).

On at least one edge 19A, 19B (here on both of them) at least one elastically deformable blade 30 is provided in the groove means 20, on at least one of the cheeks 21, 22 defining the groove means 20 and projecting towards the other cheek.

The elastically deformable blade 30 is elongate longitudinally relative to the cheeks 21, 22.

In other words, it is parallel to the back 23 of the groove means 20.

The elastically deformable blade 30 is in one piece with an innermost section of the cheek 22, forming an extension of it, and is associated with a similar blade 30 elastically deformable in the opposite direction and in one piece with the other of these sections.

At first directly in line with the respective sections of the innermost cheek 22, the elastically deformable blades 30 thereafter extend obliquely towards the outermost cheek 21, approaching each other symmetrically to a common median transverse plane passing through the gap between them.

The elastically deformable blades 30 are individually separated from the back 23 of the groove means 20 by a slot 31.

An embellisher 32 is associated with the equipment support 10. Its outside dimensions are larger than those of the support.

The embellisher 32 is separate from the equipment support 10 and may be attached to it from the front, snap-fastener fashion.

It is therefore removable.

The embellisher 32 is in the form of a flat frame whose square inside contour 33 is the same size as the inside contour 28 of the front flat frame 24 of the equipment support 10. However, its outside contour on all sides is slightly larger than the outside contour of the flat frame 24 so that it projects all around the latter when applied to it.

The embellisher 32 has on the back and right around its perimeter an upstanding rim 34 for at least partial nesting inter-engagement with the flat frame 24 of the equipment support 10 (FIGS. 6 and 8).

The equipment support 10 has at the front at least one hole 35 in its flat frame 24 adapted to receive a snap-fastener peg 36 in corresponding relation to it projecting from the back of the embellisher 32.

Here there are four holes 35 on the front of the equipment support 10, adjacent respective corners of the inside contour 28 of the flat frame 24, and opening in pairs into the recesses 29 on the back of the latter.

The embellisher 32 has on its back four snap-fastener pegs 36 slit axially in order to confer some transverse elasticity upon them.

Their end is preferably frustoconical to facilitate insertion into a hole 35.

As is the usual practise with the cover 15, to use the equipment support 10 in accordance with the invention it is fitted from the front over the lips 13 of a trunking body 11 by virtue of the groove means 20 on two of its opposite sides 19A, 19B.

This presupposes temporary elastic deformation of the trunking body 11, its side flanges 14 simply moving apart.

As an alternative to this, however, the equipment support 10 may instead by engaged with the trunking body 11 from one end and then slid along it.

For a trunking body 11 suitable for the smaller cover width L1, the equipment support 10 is engaged longitudinally on the lips 13 by its longer sides 19A, as shown in FIGS. 1 and 2.

For a trunking body suitable for the greater cover width L2, however, it is engaged transversely on the lips 13 by its shorter sides 19B, as shown in FIG. 10.

In all cases, and as shown diagrammatically in FIGS. 6 and 7 for one of the shorter sides 19B, the elastically deformable blades 30 of the groove means 20 bear elastically on the back of the lips 13, clamping the flat frame 24 of the equipment support 10 against the front of the lips 13.

The equipment support 10 when fitted in this way to the lips 13 of a trunking body 11 may be abutted with a cover 15 on either or both sides, as shown in FIGS. 1, 2 and 10.

The embellisher 32 is then snapped on from the front and advantageously covers the respective ends of the covers 50.

Of course, the equipment support 10 could equally well be abutted against another equipment support 10 of the same type on either or both sides.

The present invention is not limited to the embodiments described and shown but encompasses any variant execution thereof.

In particular, the embellisher associated with the equipment support in accordance with the invention may instead be an integral part of the equipment support, being in one piece with it, especially if the equipment support and/or the covers against which it may be abutted can slide sufficiently on the trunking body to which they are adapted to be fastened.

There is claimed:

1. Equipment support adapted to be attached to the body of trunking having two inwardly facing lips, said support having groove means adapted to be engaged on said lips on each edge of each of two mutually orthogonal pairs of opposite edges, wherein at least one elastically deformable blade member is provided in the groove means on at least one of two cheeks defining said groove means and projecting towards the other of the two cheeks.

2. Equipment support according to claim 1 wherein said elastically deformable blade is elongate lengthwise of the cheeks.

3. Equipment support according to claim 2 wherein the innermost cheek is divided into at least two sections and the elastically deformable blade member is in one piece with one section of which it forms an extension.

4. Equipment support according to claim 3 wherein another blade member of the same type but elastically deformable in the opposite direction is associated with each elastically deformable blade member.

5. Equipment support according to claim 1 wherein at least one elastically deformable blade member is provided on each edge in the groove means.

6. Equipment support adapted to be attached to the body of trunking having two inwardly facing lips, said support having groove means adapted to be engaged on said lips on each edge of each of two mutually orthogonal pairs of opposite edges, wherein an embellisher is associated with the support and has outside dimensions larger than those of the support.

7. Equipment support according to claim 6 wherein the associated embellisher is removable and may be fitted to it from the front, 8. Equipment support according to claim 7 wherein it has at the front at least one hole adapted to engage a snap-fastener peg in corresponding relationship thereto projecting from the back of the embellisher.

9. Equipment support according to claim 6 wherein the associated embellisher is in one piece with it.

10. Equipment support adapted to be attached to trunking body having a pair of lips facing each other, said equipment support comprising pairs of mutually orthogonal edges, groove means running along each of said edges of said support, opposed pairs of said groove means being selectively engageable with a pair of lips for mounting said support on the trunking body.

11. Equipment support according to claim 10, wherein said groove means along each of said edges comprises substantially parallel inner and outer cheeks, each of said outer cheeks extending substantially along the entire length of the corresponding edge, said outer cheeks together forming a common flat frame having a rectangular outside contour.

12. Equipment support according to claim 11, wherein the inner cheek is subdivided into two spaced sections extending toward each other and connected to corresponding sections of adjacent edges.

13. Equipment support according to claim 10, wherein the distance between the respective pairs of groove means are different and correspond to different spacings between pairs of lips of trunking bodies.

14. Equipment support according to claim 10, further comprising a frame, and elastically deformable projections associated with the grooves for elastically bearing against a back portion of the lips and clamping the frame against a front portion of the lips.

* * * * *